United States Patent [19]

Badalich

[11] 4,030,821
[45] June 21, 1977

[54] REAR SCREEN PROJECTOR WITH REMOTE PROJECTION CAPABILITY

[75] Inventor: Frank C. Badalich, Chicago, Ill.

[73] Assignee: Bell & Howell Company, Chicago, Ill.

[22] Filed: Jan. 9, 1976

[21] Appl. No.: 647,834

[52] U.S. Cl. .................................. 353/71; 353/78; 353/101

[51] Int. Cl.² .................. G03B 21/28; G03B 21/30

[58] Field of Search .................. 353/71, 72, 74–78, 353/119, 76, 79, 101, 85, 21

[56] References Cited

UNITED STATES PATENTS

| 2,391,879 | 1/1946 | Chambers | 353/71 |
| 3,159,841 | 12/1964 | Castedello et al. | 353/85 X |
| 3,885,868 | 5/1975 | Hadzimihalis | 353/71 |
| 3,904,286 | 9/1975 | Omi et al. | 353/79 |

Primary Examiner—Harry N. Haroian
Attorney, Agent, or Firm—John E. Peele, Jr.

[57] ABSTRACT

Disclosed is a slide projection apparatus convertible for projection of an image either onto a remote surface or onto a screen built into the housing of the apparatus. A door, for selectively blocking the projection path, is coupled with a projection lens supported on a carrier. The lens is alternatively positionable along a substantially horizontal axis for straight ahead external projection and is positionable substantially perpendicular to that axis for internal projection onto the built-in screen. During external projection, the lens is focusable. Upon return to internal projection condition, the lens is automatically focused for the built-in screen. The projection apparatus includes a device to cause the light source to be energized at a high brightness level for external projection and to be automatically changed to a lower brightness level for internal projection.

11 Claims, 9 Drawing Figures

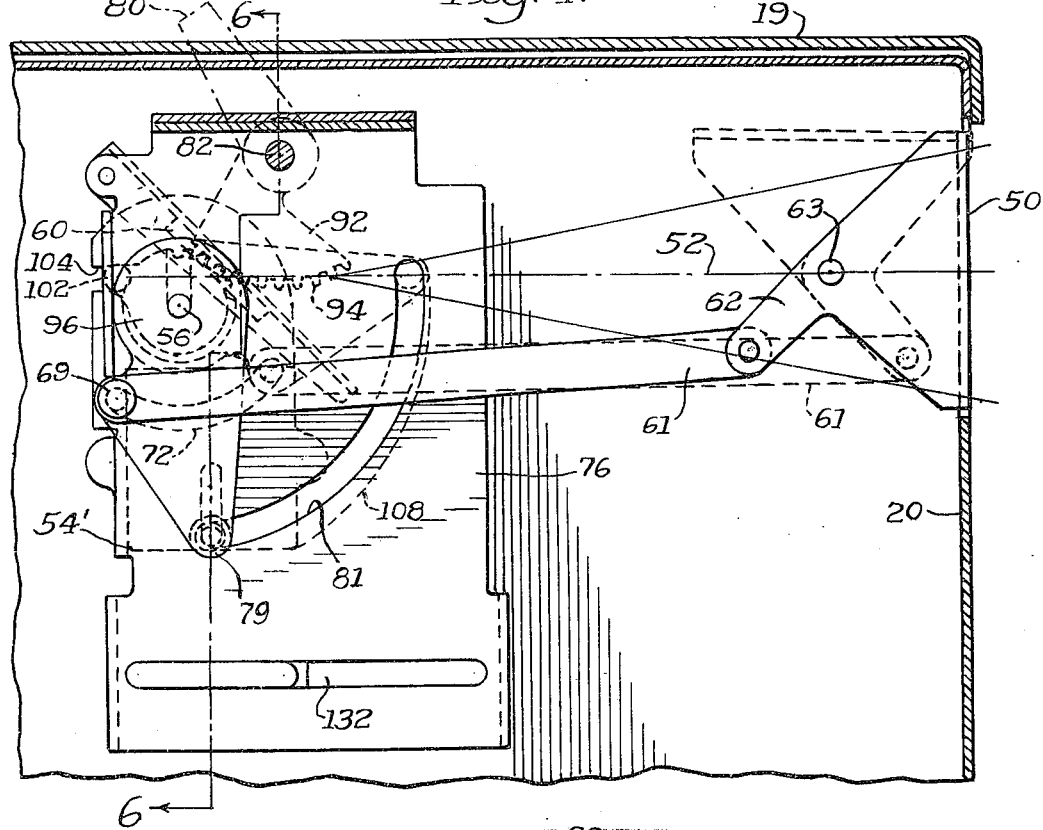
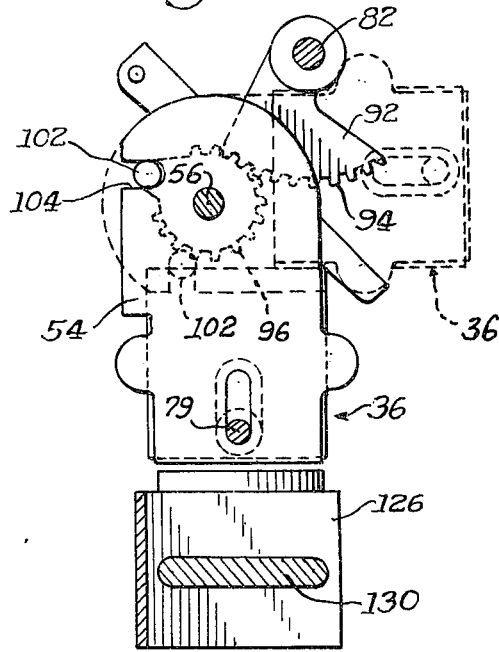
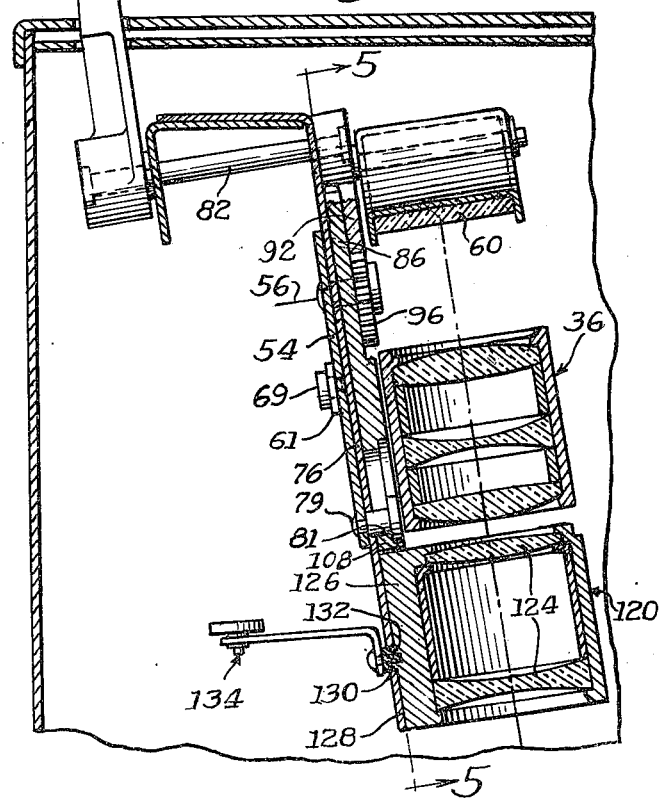

REAR SCREEN PROJECTOR WITH REMOTE PROJECTION CAPABILITY

The present invention relates to an image projection apparatus or slide projector, and more particularly, to an apparatus with a housing having a built-in screen onto which an image from film or slides can be projected and an opening through which an image can be projected onto a remote surface in response to orientation of a projection lens for enabling selection of the projection path.

Various designs of motion picture and still projectors, convertible for projection of images onto remote and built-in surfaces are known. However, few of these designs have achieved substantial commercial success since several manual operations were usually required to convert the projector from remote projection to at-the-unit viewing. Further, these projectors are generally bulkier, heavier, and more expensive than comparable single purpose units. Attempts to combine the projectors have resulted in compromises with the images on the built-in screen being smaller than desirable and often the remotely projected image being of less brilliance.

The present invention provides an arrangement by which the image can be projected onto either the built-in screen or can be projected onto a remote surface or screen. The apparatus of this preferred embodiment is a round tray slide projector in which slides are transported into the projection station by gravity in a relatively well known manner, and are handled and returned to the tray by mechanisms built into the housing and functioning in a known manner. In one side of the housing is arranged a screen onto which an internally reflected image may be projected for viewing by the user and others close to the projector. In another side of the projector is located an opening aligned with the projection path, and through which an image may be projected externally onto a remote surface. A cover door for the projection opening is coupled to a projection lens shifting mechanism. When the projection opening cover door is opened, the lens is arranged with the optical axis aligned with the optical path extending through the opening for projection of the image onto the remote surface. A focusing device is arranged within the projector to adjust the lens for focusing of the projected image onto that remote surface. As the door is closed, the lens if pivotably rotated into a position to direct the projected image toward built-in mirrors which in turn pass the image to the built-in screen. During the re-positioning of the lens, if the lens were focused on a remote surface, an automatic re-focusing action is performed whereby the lens is focused appropriately for the fixed length image path to the built-in screen. An image enlarger is provided proximate the lens when the latter is in the built-in projection orientation so that an operator may selectively enlarge a portion of the image or enlarge the entire image should it be smaller than the "standard" double frame 35mm format. Simultaneously, with pivoting of the lens between the remote and the built-in projection orientations, the projection lamp illumination is altered to provide lower illumination of the image projected onto the built-in screen relative to the illumination for the image projected onto a much more distant remote surface. Therefore, a unit is provided which is readily convertible from remote projection to built-in projection responsive primarily to the positioning of the projector housing door.

An object of the present invention is to provide a relatively compact projector enabling conversion of the apparatus for projection of an image onto either a remote surface or a built-in screen, the conversion operation including automatic re-focusing of the lens for the built-in screen and modification of the quantity of illumination.

Further and other objects will be apparent from the description of the accompanying drawings in which like numerals refer to like parts.

IN THE DRAWINGS

FIG. 4 is an enlarged fragmentary sectional detail view of the lens positioning mechanism;

FIG. 5 is a sectional detail view taken along section line 5—5 of FIG. 6;

FIG. 6 is a fragmentray elevational view taken along section line 6—6 in FIG. 4;

Figure 1:
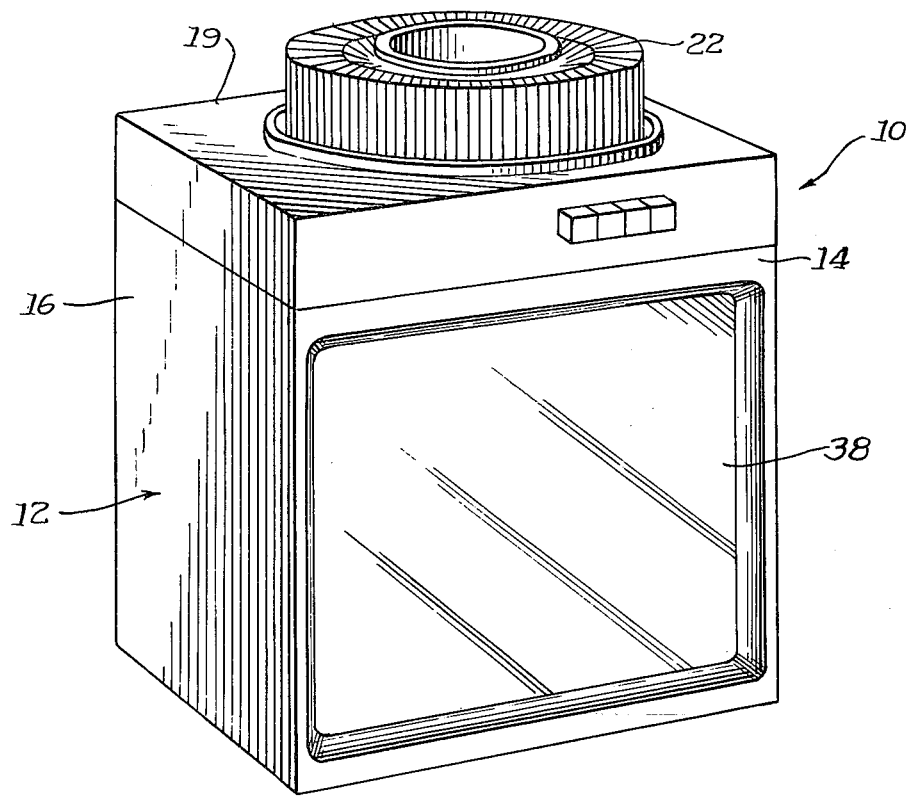
FIG. 1 is a front perspective view of a projection apparatus incorporating features of this invention.
Figure 2:
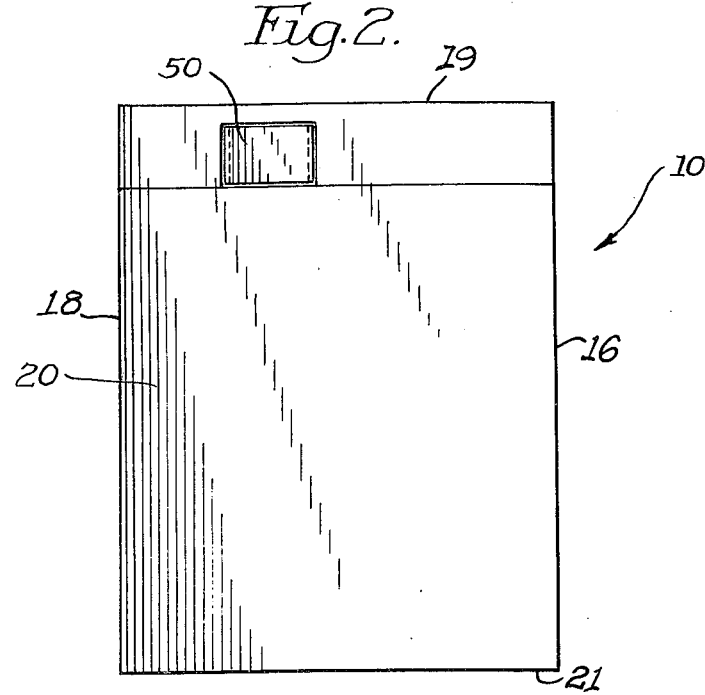
FIG. 2 is a rear elevational view of the projection apparatus of FIG. 1.
Figure 7:
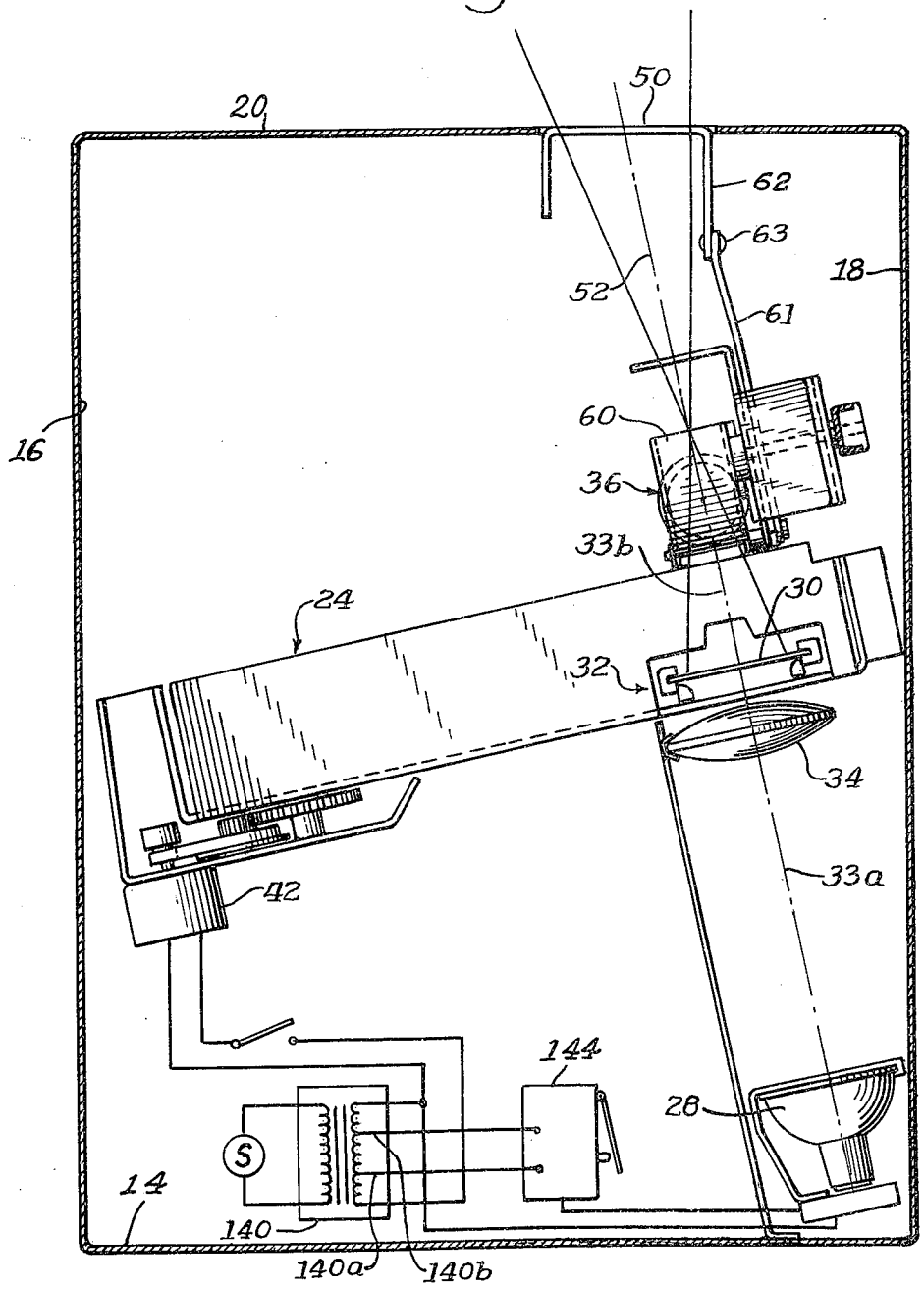
FIG. 7 is an overall plan view of the apparatus of FIG. 1 with parts broken away and parts removed for clarity and including a schematic representation of selected electrical circuitry.

Referring to the figures and particularly FIGS. 1 and 2, there is shown an image projection apparatus in the form of a slide projector 10 with the primary components substantially enclosed within a housing 12. The housing 12 includes a front wall 14, side walls 16, 18, and a top wall 19. A rear wall 20 and a bottom wall 21 complete the housing to provide a substantially enclosed and substantially dust proof container for the slide handling and optical components of the projector. In FIG. 1, on the top wall 19 of the housing is shown supported a slide supply means 22 such as a round tray. Slides can be supplied alternatively in any of the known slide supply means including a stack loader or the like. As shown in FIG. 7, a slide handling and tray indexing mechanism, 24 if selected of the type to handle the slide supply means, and the slides therein. In this preferred embodiment, slides are contemplated of the "standard" double frame 35mm format mounted in 2 inch square mounts. Also, 110 format slides in the 2 inch square mounts can be used, as well as other formats which can be accepted in the round tray slide supply means 22. The slide handling and tray indexing mechanism 24 is a known mechanism, shown only insofar as is necessary for an understanding of the invention.

Of the several optical components of the projector, a projection lamp 28 is positioned internally of the housing 12. From the projection lamp, light is emitted to illuminate a slide 30 positioned at a projection station 32. The light beam passes along a first optical path portion 33a from the lamp through one or more condensor components 34 before passing through the slide, and through a second optical path portion 33b including a projection lens 36 after passing through the slide. Ultimately, the rays of the light beam passing along the optical path or axis form an image on a surface which in this preferred embodiment may be either an external or remote screen (not shown) or an internal or built-in screen 38. The projection lens 36 is adjustably positionable for focusing of the slide image as required for the built-in screen 38 and the remote surface. These several optical components are selected and arranged for projection of sufficiently brilliant images onto the respective surfaces for comfortable viewing.

Many of the mechanical components of the slide projector apparatus are known components, such as the slide handling mechanism 24, and a motor 42 for driving the slide handling and tray indexing mechanism. Further, other mechanical components of this slide projector include devices cooperating with selected of the optical components for selectively directing the second optical path portion alternatively onto either the built-in screen 38 or the remote surface.

In the wall described as the rear wall 20 of the housing, a door 50 is mounted for pivotal movement between an open condition clear of the optical axis portion 52 and a closed condition across that optical axis portion. The door is manually positionable to the alternative conditions according to the intended use of the slide projector. For remote projection, the door 50 is opened and the projection lens 36 aligned for projection of the slide image therethrough along an essentially straight optical path.

Figure 3:
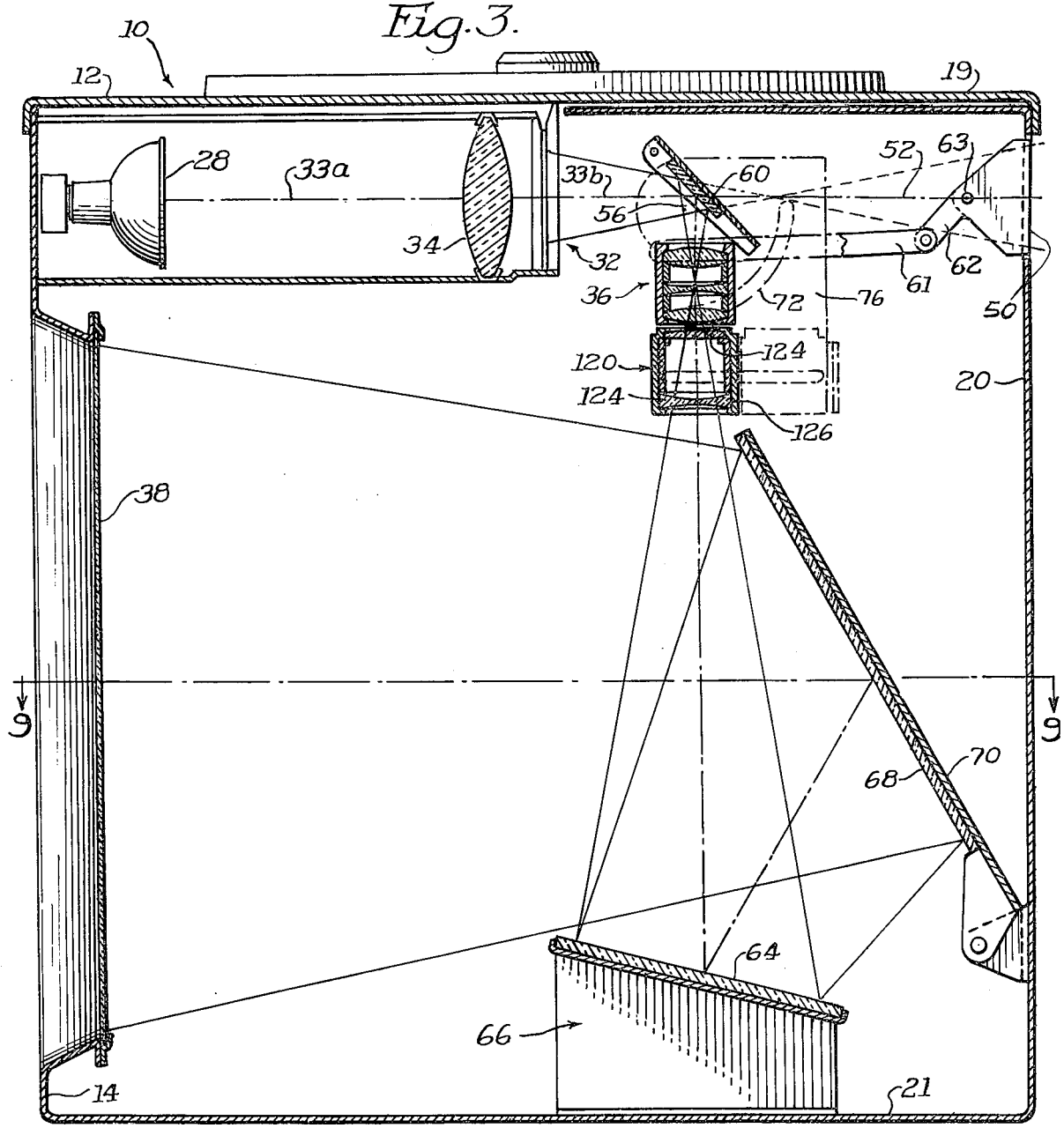
FIG. 3 is an elevational sectional view of the apparatus with parts cut away and parts removed for clarity.

For projection of the slide image onto the built-in screen 38, as shown in FIG. 3 the door 50 is closed. As shown in more detail in FIGS. 4, 5, and 6, connected to the door is a projection lens carrier 54 on which the projection lens 36 is supported for movement about an axis 56. For remote image projection, the projection lens is positioned with the optical axis defined thereby substantially perpendicular to the plane of a slide in the projection station 32. However, for internal projection onto the built-in screen 38, the projection lens is pivoted about the axis 56 to a position essentially perpendicular to the remote projection axis. The optical axis defined by the lens is re-oriented to be essentially parallel to the plane of the slide. Supported on the projection lens carrier 54 is a mirror 60 which is displaceable between a position out of the second optical path portion 33b during remote projection, and into that optical path portion during internal projection. This first mirror 60 deflects the image and the optical path from the optical axis perpendicular to the slide to a path essentially parallel therewith.

For internal projection, the housing door 50 is closed and the first mirror 60 is inserted in the optical path portion at approximately 45° to the primary optical path portion 33b. Light rays from a slide are deflected by the first mirror 60 through the projection lens 36 which is substantially perpendicular to the primary optical path portion, but, for reasons as set forth hereinafter, may be arranged slightly offset or angled from an exact perpendicular orientation. From the projection lens, the light rays pass toward a second mirror 64 fixed to a mirror support 66 attached to the bottom wall 21 of the housing. The second mirror reflects the light rays and image toward a third mirror 68 fixed to another mirror support 70 attached within the housing. From the latter mirror, the light rays of the projected image are directed to the internal surface of the built-in rear projection screen 38 for viewing.

The mirrors and selected of the optics may be oriented at angles other than exact 45° or 90° angles to one another to cause the projected image to impinge on the screen without distortion. Without the specific optics/mirror orientations, the projected image would be distorted since the projection station is offset from alignment with the center of the projection screen. Notwithstanding that the projection station can be aligned with the center of the screen, such an arrangement is undesirable for a projector accepting a round tray slide supply and projecting the image onto a maximum size built-in screen mounted in a minimum dimensioned housing. That is, slides are retained about the periphery of the round tray from which they are fed by gravity to the projection station which, therefore, is arranged off-set in the housing. To compensate in part for the off-set, the first optical path portion in this embodiment is angled slightly from an angle which would be parallel with the side of the housing. The angle is selected as being approximately 12° toward the center of the built-in screen 38, yet perpendicular to the slide in the projection station, as seen in FIG. 7.

Because of the desired angular orientation of the optical path to the built-in screen, the optical axis of the projection lens 36 is off-set slightly from a vertical perpendicular to the horizontal of the top wall and approximately 10° toward the center of the projection screen as seen in FIG. 5. Together with the complex planes in which the second and third mirros are oriented, the final image is directed to the screen so that the central ray is essentially perpendicular to the surface of the screen, and essentially centered thereon.

To accomplish pivoting of the projection lens carrier 54 and the projection lens 36 supported thereon, the aforementioned housing door 50 is actuated from one condition to the other. A link 61 is connected to an arm 62 fixed to or integral with the door. This door assembly is pivoted about pivot axles 63 fixed in the housing. As the door is swung about the pivot axles as from open to close, the link 61 coupled at its other end to the lens carrier 54 by a coupling pin 69, drives the carrier about the stub shaft defining axis 56. The link-to-carrier coupling pin 69 extends into a shaped slot 72 formed in a mechanism support plate 76, onto which the lens carrier 54 is mounted. The combined action of the door 50 and the slot and pin cause the lens carrier to be shifted from one position to the other responsive to movement of the door or another mechanism connected therewith. Movement of the lens carrier 54 about the pivot is restricted by the pin 79 which extends through the arcuate slot 81 in the mechanism support plate 76.

When the lens 36 is adjusted to the remote projection condition and the door 50 is open, focusing of the lens is necessary since the projection surface may be near or far with respect to the location of the projector 10. To accomplish the focusing operation, an externally accessible and manually operable focus control 80 is fixed to a shaft 82, which extends into the vicinity of the lens and the lens supporting mechanism. Fixed to the internal end of the shaft 82 is a sector plate gear portion 92 having an arcuate periphery on which gear teeth 94 are formed. The gear teeth are in mesh with the teeth of a partial driven gear 96 mounted for rotation about the stub shaft of axis 56 around which the lens carrier 54 pivots. As the focus control 80 is adjusted as by rotation, the sector plate 92 is rotated. The partial driven gear 96 is coupled to the lens carrier by a connection formed of a pin 102 and a slot 104. The pin 102 of the connection extends a short length from a non-geared portion of the partial driven gear 96 in a direction parallel with the axis 56 about which the gear is rotatable. The upper plate portion 86 of the lens carrier 54 is provided with the slot 104 of the connection, which slot is arranged off-set with respect to the axis about which the partial gear 96 and the lens carrier are rotated.

As the focus control 80 is rotated, the motion is transmitted to the lens carrier 54 through the gearing and the pin and slot connection. Whether the lens carrier plate 54 is oriented for internal projection, solid lines in FIG. 5, or external projection, dashed lines in that figure, the plate is caused to move axially of the optical axis defined by the projection lens 36, although the focusing movement for internal projection is limited. As the lens carrier is shifted, the projection lens retained thereon by friction is adjusted therewith. Thus, the operator is able to focus the lens for the required lens-to-slide distance.

Focusing of the projected image onto a remote screen requires that the projection lens be moved outwardly increasing the lens-to-slide distance. Conversely, when the projected image is focused on the built-in screen, the lens is retracted to a relatively short lens-to-slide distance. Further, since the slide-to-screen distance for internal projection is essentially fixed, the lens-to-slide distance can be predetermined for repeatable focusing. To accomplish such repeatable focusing, a cam shaped ledge 108 is provided on the mechanism support plate 76. As the lens carrier 54 is pivoted from the remote projection condition to internal projection condition, the lens carrier is moved relative to the cam ledge of the support plate. In this preferred embodiment, an edge 54' of the lens carrier 54 rides against the cam ledge during this movement. If the lens was displaced for distance focusing, the lens carrier is forward. As the carrier is pivoted toward the internal projection condition, the cam ledge 108 forcibly displaces the lens carrier rearwardly until the lens reaches the "home" condition. The "home" portion of the cam has been calculated to position the projection lens in the predetermined lens-to-slide distance for focusing on the built-in screen. The lens carrier and the projection lens are capable of movement a small amount when in the internal project condition to compensate for focus changes which might be necessitated to correct for caused by "popping" of the slide material.

The projection lens 36 is selected with a focal length providing for full screen projection along the longer dimension of a "standard" double frame 35mm slide when the lens is in internal projection condition. Newer film formats provide slides having image areas of smaller dimensions, e.g., a 110 format slide. Although the image area of these small slides may be less than the area of "standard" frames, the image material may be mounted in a 2 inch square mount of dimensions similar to those of the "standard" slides. Thus, these smaller slides may be projected in the slide projector according to the present invention. Since the image area of such a slide is smaller, and the focal length of the projection lens is fixed, the image projected onto the built-in screen 38 will be proportionately smaller. That is, the image will not completely fill the screen along the longer dimension of the image area.

To provide a larger projected image for the smaller format slides during internal projection, an image expander 120 is arranged for location in the optical path of the projection lens 36. Since the size of the slide in the projection station is independent of the projection lens and/or the image expander, the image of a "standard" slide can be enlarged to an extent over-filling the screen if the expander is inserted in or remains in the optical path during projection of such a slide. The resulting condition provides the viewer with the capability of enlarging a portion of the image of the "standard" slide for more detailed study, if desired, as well as enlarging the small format image to full screen dimensions.

The image expander 120 of this embodiment includes optical elements 124 mounted in a barrel 126 defining a positive lens "attachment" for use with the projection lens. One side of the barrel 126 is formed with a planar surface 128 from which extends a rib 130 dimensioned to fit slidably in a slot 132 formed in the mechanism support plate 76 on which the lens carrier 54 is mounted. By a link 134 coupled to the expander barrel, the expander can be displaced to either a position clear of the optical path of the projection lens or a position aligned in the optical path. The rib and slot connection are dimensioned to enable positioning of the expander in the alternate positions.

When the projection lens is displaced to the internal projection condition, and the image expander 120 is displaced for non-use, the projection lens is capable of being focused over an extended range to permit projection of so-called "thick" of "thin" slides.

Figure 8:
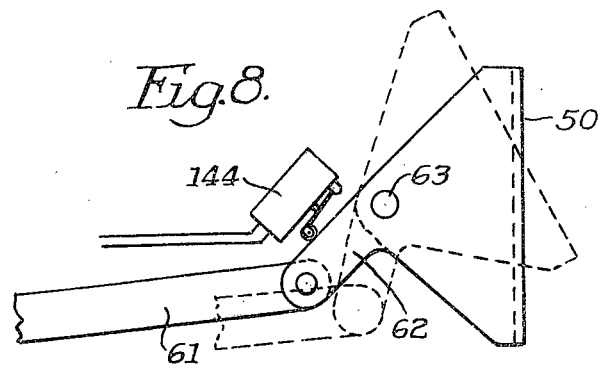
FIG. 8 is a detail view of the projector housing door including a schematic representation of a micro-switch actuation arrangement.
Figure 9:
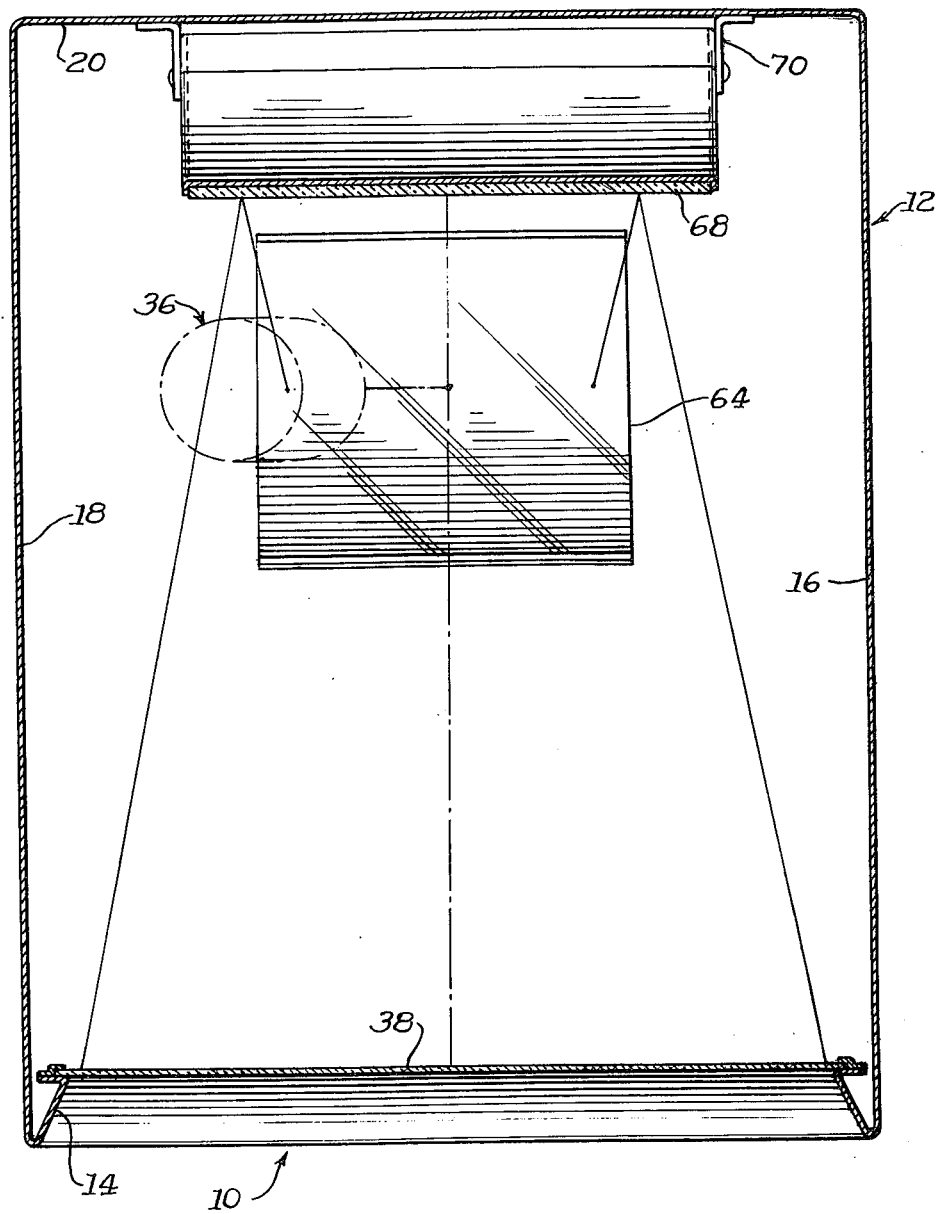
FIG. 9 is a sectional view of the projection apparatus in plan taken along section line 9—9 in FIG. 3.

As further seen in FIG. 7 projection lamp 28 is connected in circuit with a transformer 140 which is connected during projection operation to a power supply 5. The transformer is selected with multiple tapped windings 140a, 140b, providing the lamp alternatively with relative high voltage and relatively low voltage respectively for high and low light outputs. In this preferred embodiment and as shown in FIG. 8, a micro-switch 144 is arranged for actuation by the housing door 50 when the door is in one or the other of its alternative positions. The micro-switch is in circuit with the transformer and the lamp to enable the lamp to be energized from the high voltage tap when the door is open for remote projection, but to be energized from the low voltage tap when the door is closed for internal projection.

The aforegoing description is illustrative of a preferred embodiment of a slide projector which is convertible for projection of the image onto a remote surface and onto a built-in screen, responsive to opening or closing of a housing door. When the door is closed, the projection lens is pivoted for projection onto the built-in screen; while when the door is open, the lens is pivoted for projection onto the remote surface. The focusable lens is re-focused automatically for internal projection when the lens is conditioned from external projection to internal projection. Also, the output of the light source is changed from a high output to a low output. The image expander is available for use during internal projection.

What is claimed is:

1. In a slide projection apparatus having a slide handling mechanism, the apparatus being convertible for projection of an image from a slide alternatively onto a remote surface and a built-in screen, the apparatus having projection means substantially enclosed within a housing, the projection means comprising:
a focusable projection lens;
lens carrier means supporting said projection lens and being mounted for pivotable movement of said lens relative to said slide handling mechanism between a first orientation for projection of an image onto the remote surface, and a second orientation for projection of an image onto the built-in screen;
first lens focusing means accessible externally of said housing being coupled internally of said housing to said lens; and
second lens focusing means arranged fixedly within said housing for focusing of said lens for a predetermined image to screen distance when said lens mounting means is moved relative to said focusing means upon movement from said first lens orientation to said second lens orientation.

2. A projection means as in claim 1 including a first mirror means, a projection lamp and condenser optics for defining with a slide to be projected an optical axis portion; and
wherein said lens carrier means supports said first mirror means for selective positioning in said optical axis portion when said projection lens is oriented to said second orientation and out of said optical axis portion when said projection lens is oriented to said first orientation.

3. A projection means as in claim 1 including:
projection lens positioning means coupled to said lens carrier means;
a projection lmap operable at different light outputs; and
means coupled to said projection lens positioning means and said lamp for selecting one of said light outputs of said projection lamp when said projection lens is oriented for projection of an image onto said remoe surface and for selecting another of said light outputs when said projection lens is oriented for projection of an image onto said built-in screen.

4. A projection means as in claim 1 including image expander optical means selectively positionable in an optical path defined by said projection lens when said projection lens is in an orientation for projection of an image onto said built-in screen, whereby said projected image is expanded.

5. A projection means as in claim 1 wherein said first lens focusing means includes a manually adjustable means, and said lens carrier means has cooperating means for causing lens focusing displacement said lens carrier means responsive to adjustment of said manually adjustable means.

6. A projection means as in claim 1 wherein said lens carrier means includes a cam follower and wherein said second lens focusing means is a cam surface relative to which said cam follower means is movable when said projection lens is oriented form said first orientation to said second orientation to cause said lens carrier means to position said lens in a focused condition for a predetermined slide to screen distance when said projection lens is in said second orientation.

7. In a slide projector apparatus convertible for projection of an image alternatively onto a remote surface and a built-in screen, the apparatus having projection means substantially enclosed within a housing into which the screen is built, the projection means comprising:
a focusable projection lens;
lens carrier means supporting said projection lens for focusing movement and being mounted for pivotable movement to orient said lens in a first orientation for projection of an image onto the remote surface, and in a second orientation for projection of an image onto the built-in screen;
and the apparatus including:
door means pivoted to said housing for movement selectively to open and closed conditions, and coupled with said lens carrier means for orienting said lens to said first orientation when said door means is in said first condition and for orienting said lens to said second orientation when said door means is in said second condition.
wherein an image projected through said projection lens is selectively projected onto said remote surface and onto said built-in screen.

8. A slide projector apparatus as in claim 7 including:
projection lens positioning means coupled to said lens carrier means;
a projection lamp operable at different light outputs; and
means coupled to said projection lens positioning means and said projection lamp for selecting one of said light outputs of said projection lamp when said projection lens is oriented for projection of an image onto said remote surface and for selecting another of said light outputs when said projection lens is oriented for projection of an image onto said built-in screen.

9. A slide projector apparatus as in claim 7 wherein said door means is coupled to said lens carrier means by a link means to move said projection lens to alternate positions responsive to orientation of said door means.

10. A projection means as in claim 7 including image expander optical means selectively positionable in an optical path defined by said projection lens when said projection lens is in an orientation for projection of an image onto said built-in screen.

11. A projection means as in claim 10 wherein said image expander optical means includes optical element mounting means supporting said optical elements for slidable movement into said optical path, said mounting means having a guide member movable within a guide fixed in said housing.

* * * * *

UNITED STATES PATENT OFFICE
CERTIFICATE OF CORRECTION

PATENT NO. : 4,030,821
DATED : June 21, 1977
INVENTOR(S) : Frank C. Badalich

It is certified that error appears in the above-identified patent and that said Letters Patent are hereby corrected as shown below:

Column 7, line 32 (Claim 3, line 4), change the spelling of "lmap" to --lamp--.

Column 7, line 38 (Claim 3, line 10), change the spelling of "remoe" to --remote--.

Column 7, line 57 (Claim 6, line 5), change the spelling of "form" to --from--.

Column 8, line 24 (Claim 7, line 21), after "condition", delete "." and insert --,--.

Signed and Sealed this

Seventeenth Day of July 1979

[SEAL]

Attest:

Attesting Officer

LUTRELLE F. PARKER
*Acting Commissioner of Patents and Trademarks*